United States Patent
Miyamoto et al.

(10) Patent No.: US 10,081,040 B2
(45) Date of Patent: *Sep. 25, 2018

(54) METHOD FOR RECOVERING RARE EARTH ELEMENT

(71) Applicant: HITACHI METALS, LTD., Tokyo (JP)

(72) Inventors: Yu Miyamoto, Mishima-gun (JP); Hiroyuki Hoshi, Mishima-gun (JP); Atsushi Kikugawa, Mishima-gun (JP)

(73) Assignee: HITACHI METALS, LTD., Tokyo (JP)

( * ) Notice: Subject to any disclaimer, the term of this patent is extended or adjusted under 35 U.S.C. 154(b) by 430 days.

This patent is subject to a terminal disclaimer.

(21) Appl. No.: 14/654,906

(22) PCT Filed: Dec. 26, 2013

(86) PCT No.: PCT/JP2013/084922
§ 371 (c)(1),
(2) Date: Jun. 23, 2015

(87) PCT Pub. No.: WO2014/104205
PCT Pub. Date: Jul. 3, 2014

(65) Prior Publication Data
US 2015/0344991 A1 Dec. 3, 2015

(30) Foreign Application Priority Data

Dec. 26, 2012 (JP) .................. 2012-283287
Jun. 26, 2013 (JP) .................. 2013-133415

(51) Int. Cl.
| | | |
|---|---|---|
| *B09B 3/00* | (2006.01) |
| *C22B 1/02* | (2006.01) |
| *C22B 59/00* | (2006.01) |
| *C22B 7/00* | (2006.01) |

(52) U.S. Cl.
CPC ............. *B09B 3/0083* (2013.01); *C22B 1/02* (2013.01); *C22B 7/001* (2013.01); *C22B 59/00* (2013.01); *Y02P 10/214* (2015.11)

(58) Field of Classification Search
CPC . C22B 59/00; C22B 7/001; C22B 1/02; Y02P 10/212; Y02P 10/214
USPC ....................................... 423/21.1
See application file for complete search history.

(56) References Cited

U.S. PATENT DOCUMENTS 3,549,350 A * 12/1970 McGee ............... B22F 9/00
75/353
2014/0186239 A1 7/2014 Hoshi et al.

FOREIGN PATENT DOCUMENTS

| CN | 1511966 A | | 7/2004 |
|---|---|---|---|
| JP | 61-122121 | * | 6/1986 |
| JP | 2005-2463 A1 | | 1/2005 |
| JP | 2006-077264 A | | 3/2006 |
| JP | 2012-41588 A1 | | 3/2012 |
| WO | WO 2010/098381 A1 | | 9/2010 |

OTHER PUBLICATIONS

First Office Action dated Oct. 8, 2016, in the corresponding Chinese patent application No. 201380068234.3.
Extended European search report dated Aug. 4, 2016 for the corresponding European patent application No. 1389804.8.
M. Nakamoto, et al.; "Extension of Rare Earth Elements as Oxides from a Neodymium Magnetic Sludge," Metallurgical and Materials Transactions B; vol. 43B; Jun. 2012; pp. 468-476 (9 Sheets)/Cited in International Search Report.
International Search Report for International Application No. PCT/JP2013/084922 dated Apr. 1, 2014.

* cited by examiner

*Primary Examiner* — Steven J Bos
(74) *Attorney, Agent, or Firm* — Kratz, Quintos & Hanson, LLP

(57) ABSTRACT

An object of the present invention is to provide a method for recovering a rare earth element from a workpiece containing at least a rare earth element and an iron group element, which can be put into practical use as a low-cost, simple recycling system. The method for recovering a rare earth element from a workpiece containing at least a rare earth element and an iron group element of the present invention as a means for resolution is characterized by including at least a step of separating a rare earth element in the form of an oxide from an iron group element by subjecting a workpiece to an oxidation treatment, then turning the treatment environment into an environment where carbon black is present, and subjecting the oxidation-treated workpiece to a heat treatment at a temperature of 1000° C. or more in an inert gas atmosphere or in vacuum.

5 Claims, 4 Drawing Sheets

[Fig. 1]
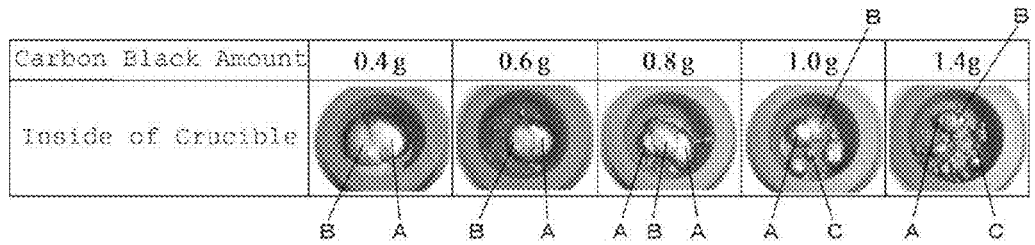
[Fig. 2]
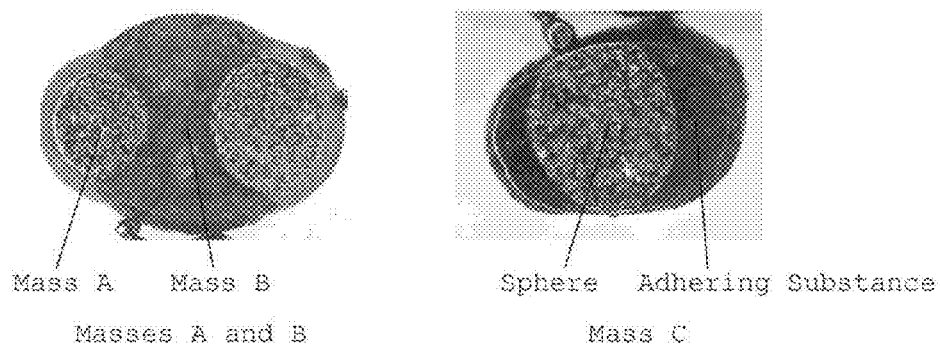
Masses A and B        Mass C
[Fig. 3]
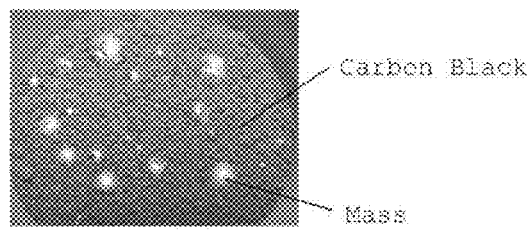
[Fig. 4]
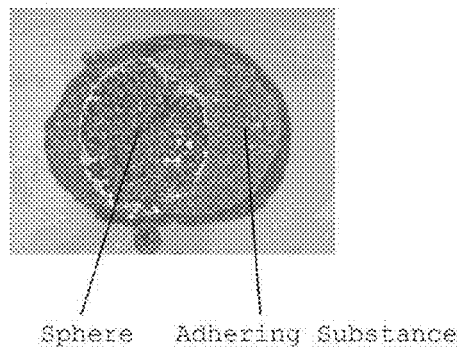

[Fig. 5]
Sphere     Adhering Substance
[Fig. 6]
| Carbon Black Amount | 0.8g | 1.8g |
|---|---|---|
| Inside of Crucible | | |
[Fig. 7]
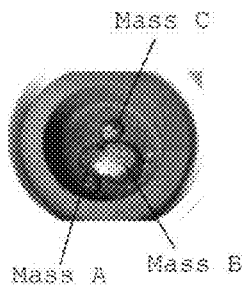
Mass C, Mass A, Mass B
[Fig. 8]
| Size of Carbon Black (μm) | >710 | 500~710 | 300~500 | 125~300 | <125 |
|---|---|---|---|---|---|
| Product | | | | | |

[Fig. 9]
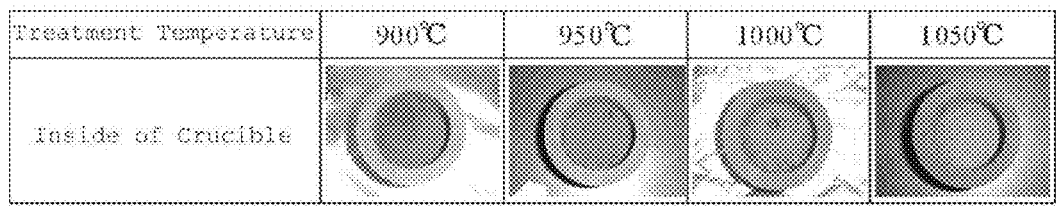
[Fig. 10]
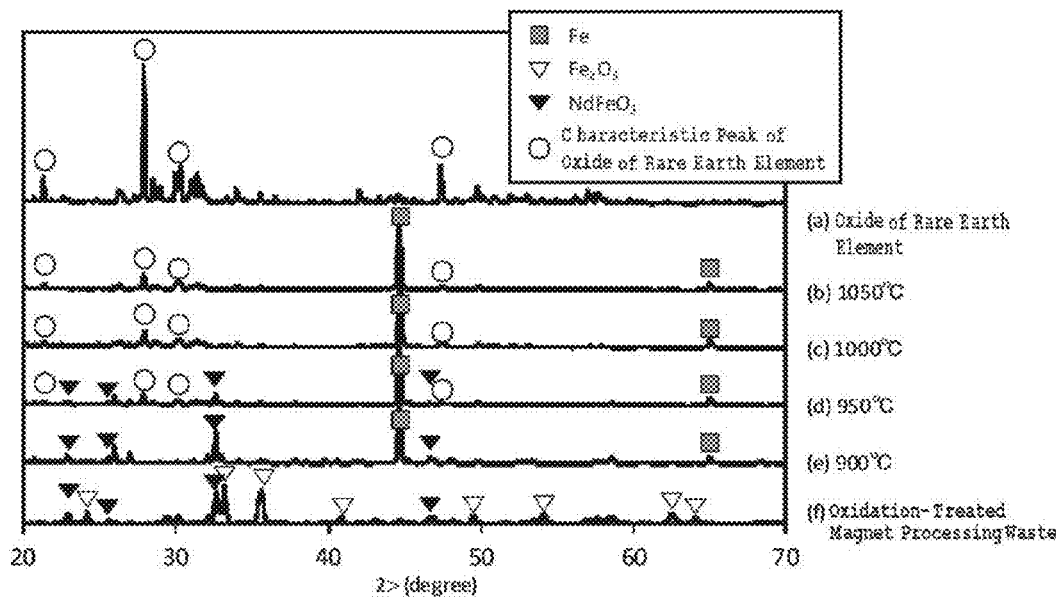
[Fig. 11]
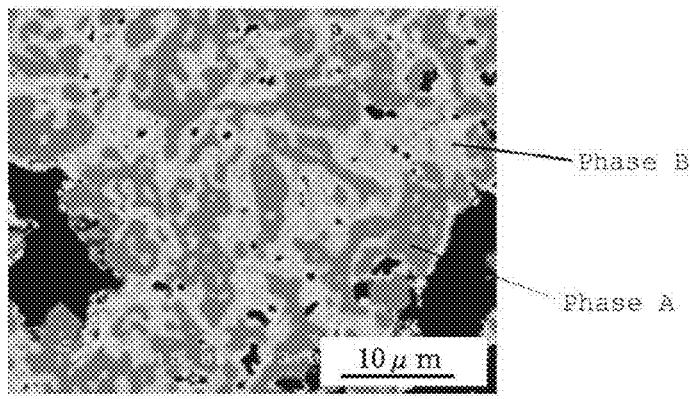

[Fig. 12]
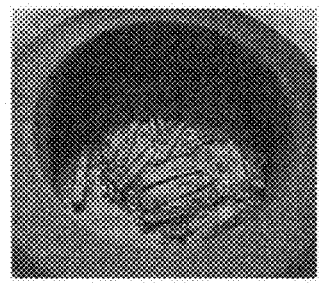

METHOD FOR RECOVERING RARE EARTH ELEMENT

TECHNICAL FIELD

The present invention relates to a method for recovering a rare earth element from a workpiece containing at least a rare earth element and an iron group element, such as an R—Fe—B based permanent magnet (R is a rare earth element).

BACKGROUND ART

As is widely known, R—Fe—B based permanent magnets have high magnetic characteristics and thus are used in various fields today. Against such a background, in R—Fe—B based permanent magnet production plants, large amounts of magnets are produced every day. However, with an increase in the amount of magnets produced, the amounts of magnet scrap discharged as a defectively processed product or the like, magnet processing waste discharged as cutting waste, grinding waste, or the like, etc., during the production process have also been increasing. In particular, with the weight and size reduction of information devices, the size of magnets used therein has also been reduced, leading to an increase in the proportion of processing allowance, and, as a result, the production yield tends to decrease year by year. Accordingly, rather than discarding magnet scrap, magnet processing waste, and the like discharged during the production process, how to recover and recycle metallic elements contained therein, particularly rare earth elements, is an important technical challenge for the future. The same also applies to how to recover rare earth elements from electrical appliances in which R—Fe—B based permanent magnets are used, etc., and recycle them as recyclable resources.

Several methods have been proposed as methods for recovering a rare earth element from a workpiece containing at least a rare earth element and an iron group element. For example, Patent Document 1 proposes a method in which a workpiece is heated in an oxidizing atmosphere to convert the contained metallic elements into oxides, followed by mixing with water to form a slurry; hydrochloric acid is added with heating to dissolve a rare earth element in a solution; an alkali (sodium hydroxide, ammonia, potassium hydroxide, etc.) is added to the obtained solution with heating, thereby precipitating an iron group element leached into the solution together with the rare earth element; then the solution is separated from undissolved substances and the precipitate; and oxalic acid, for example, is added to the solution as a precipitant to recover the rare earth element in the form of an oxalate. This method is noteworthy as a method that allows a rare earth element to be effectively separated from an iron group element and recovered. However, the method has a problem in that because an acid and an alkali are used in part of the process, it is not easy to control the process, and also the recovery cost is high. Therefore, it must be said that in some aspects, the method described in Patent Document 1 is difficult to put into practical use as a recycling system that is required to be low-cost and simple.

In addition, as a method for not oxidizing an iron group element contained in a workpiece but oxidizing only a rare earth element contained in the workpiece to thereby separate the two, Patent Document 2 proposes a method in which a workpiece is heated in a carbon crucible. Unlike the method described in Patent Document 1, this method does not require an acid or an alkali. In addition, when a workpiece is heated in a carbon crucible, theoretically, the atmosphere in the crucible is autonomously controlled to an oxygen partial pressure at which iron group elements are not oxidized and only rare earth elements are oxidized. Accordingly, this method is likely to be more advantageous than the method described in Patent Document 1 in that the process is simpler. However, when it comes to the question whether the atmosphere in a carbon crucible is autonomously controlled to a predetermined oxygen partial pressure by merely heating a workpiece in the crucible, whereby rare earth elements can be separated from iron group elements, the reality is not necessarily so. Patent Document 2 states that the oxygen content of the atmosphere in a crucible is preferably 1 ppm to 1%, but essentially no external operation is required to control the atmosphere. However, according to the study by the present inventors, at least in the case where the oxygen content is less than 1 ppm, rare earth elements cannot be separated from iron group elements. Therefore, even if it is theoretically possible that when a workpiece is heated in a carbon crucible, the atmosphere in the crucible is autonomously controlled to an oxygen partial pressure at which iron group elements are not oxidized and only rare earth elements are oxidized, in reality, the inside of the crucible has to be artificially controlled to an atmosphere having an oxygen content of 1 ppm or more. Such control can be achieved by introducing an inert gas having an oxygen content of 1 ppm or more into a crucible, as also described in Patent Document 2. However, in the case of argon gas, which is widely used as an industrial inert gas, its oxygen content is usually 0.5 ppm or less. Therefore, for introducing argon gas having an oxygen content of 1 ppm or more into a crucible, the widely used argon gas cannot be directly used, and it is necessary to especially increase the oxygen content before use. Consequently, although the process of the method described in Patent Document 2 looks simple, actually it is not. It must be said that like the method described in Patent Document 1, in some aspects, the method described in Patent Document 2 is difficult to put into practical use as a recycling system that is required to be low-cost and simple.

PRIOR ART DOCUMENTS

Patent Document

Patent Document 1: JP-A-2009-249674
Patent Document 2: WO 2010/098381

SUMMARY OF THE INVENTION

Problems that the Invention is to Solve

Thus, an object of the present invention is to provide a method for recovering a rare earth element from a workpiece containing at least a rare earth element and an iron group element, which can be put into practical use as a low-cost, simple recycling system.

Means for Solving the Problems

In view of the above points, the present inventors have conducted extensive research. As a result, they have found that when an R—Fe—B based permanent magnet is subjected to an oxidation treatment, and then the treatment environment is turned into an environment where carbon black is present, followed by subjecting the oxidation-treated magnet to a heat treatment at a temperature of 1000° C. or more in an inert gas atmosphere or in vacuum, a rare earth element contained in the magnet can be separated in the form of an oxide from an iron group element and recovered.

A method for recovering a rare earth element from a workpiece containing at least a rare earth element and an iron group element according to the present invention accomplished based on the above findings is, as defined in claim 1, characterized by including at least a step of separating a rare earth element in the form of an oxide from an iron group element by subjecting a workpiece to an oxidation treatment, then turning the treatment environment into an environment where carbon black is present, and subjecting the oxidation-treated workpiece to a heat treatment at a temperature of 1000° C. or more in an inert gas atmosphere or in vacuum.

A method as defined in claim 2 is characterized in that in the method of claim 1, the carbon black contains particles having a size of 125 µm or more.

A method as defined in claim 3 is characterized in that in the method of claim 1, at least part of the workpiece is in granular or powder form having a particle size of 500 µm or less.

A method as defined in claim 4 is characterized in that in the method of claim 1, the workpiece has an iron group element content of 30 mass % or more.

A method as defined in claim 5 is characterized in that in the method of claim 1, the workpiece is an R—Fe—B based permanent magnet.

Effect of the Invention

According to the present invention, a method for recovering a rare earth element from a workpiece containing at least a rare earth element and an iron group element, which can be put into practical use as a low-cost, simple recycling system, can be provided.

BRIEF DESCRIPTION OF THE DRAWINGS

FIG. 1 Photographs showing the inside of the carbon crucibles furnace-cooled to room temperature after the heat treatment in Example 1 (except for the case where a carbon black amount is 0.4 g, excess carbon black that was present in the crucibles has been removed).

FIG. 2 Similarly, photographs showing cross-sections of the mass A and the mass B and also a cross-section of the mass C, which are present in the crucible at a carbon black amount of 1.4 g.

FIG. 3 A photograph showing the inside of the carbon crucible furnace-cooled to room temperature after the heat treatment in Example 4.

FIG. 4 Similarly, a photograph showing a cross-section of the mass present in the crucible.

FIG. 5 Similarly, photographs showing the appearance of the sphere and that of the adhering substance adhering to the sphere surface, the both of which form the mass present in the crucible.

FIG. 6 Photographs showing the inside of the carbon crucibles furnace-cooled to room temperature after the heat treatment in Example 6 (excess carbon black that was present in the crucibles has been removed).

FIG. 7 A photograph showing the inside of the carbon crucible furnace-cooled to room temperature after the heat treatment in Example 7 (excess carbon black that was present in the crucible has been removed).

FIG. 8 Photographs of products each recovered from the inside of the carbon crucible furnace-cooled to room temperature after the heat treatment in Example 9.

FIG. 9 Photographs showing the inside of the carbon crucibles furnace-cooled to room temperature after the heat treatment in Example 10.

FIG. 10 Similarly, a chart showing the results of X-ray diffraction analysis of the individual particles forming the simple mass recovered from the inside of the carbon crucible furnace-cooled to room temperature after the heat treatment at each temperature, the oxidation-treated magnet processing waste before the heat treatment, and the oxides of rare earth elements obtained in Example 1.

FIG. 11 Similarly, a cross-sectional SEM image of the individual particle forming the simple mass produced at the heat treatment temperature of 1000° C.

FIG. 12 A photograph showing the inside of the carbon crucible furnace-cooled to room temperature after the heat treatment in Comparative Example 1.

MODE FOR CARRYING OUT THE INVENTION

The method for recovering a rare earth element from a workpiece containing at least a rare earth element and an iron group element of the present invention is characterized by including at least a step of separating a rare earth element in the form of an oxide from an iron group element by subjecting a workpiece to an oxidation treatment, then turning the treatment environment into an environment where carbon black is present, and subjecting the oxidation-treated workpiece to a heat treatment at a temperature of 1000° C. or more in an inert gas atmosphere or in vacuum.

The workpiece containing at least a rare earth element and an iron group element, to which the method of the present invention is to be applied, is not particularly limited as long as it contains a rare earth element, such as Nd, Pr, Dy, Tb, or Sm, and an iron group element, such as Fe, Co, or Ni. In addition to a rare earth element and an iron group element, additional elements such as boron may also be contained. Specific examples include R—Fe—B based permanent magnets. However, the method of the present invention is particularly suitable for application to a workpiece having an iron group element content of 30 mass % or more (e.g., in the case of an R—Fe—B based permanent magnet, the iron group element content thereof is usually 60 mass % to 82 mass %). The size or form of the workpiece is not particularly limited. In the case where the workpiece is an R—Fe—B based permanent magnet, it may be magnet scrap, magnet processing waste, or the like discharged during the production process. In order for the workpiece to be sufficiently oxidation-treated, it is preferable that the workpiece is in granular or powder form having a particle size of 500 µm or less (e.g., in view of the ease of preparation, the lower limit of the particle size is preferably 1 µm). However, the entire workpiece does not necessarily have to be in such granular or powder form, and it is possible that only part of the workpiece is in granular or powder form.

First, in the method of the present invention, the oxidation treatment of a workpiece intends to convert a rare earth element contained in the workpiece into an oxide. Unlike the method described in Patent Document 2, as a result of the oxidation treatment of a workpiece, not only a rare earth element but also an iron group element contained in the workpiece may be converted into an oxide. The oxidation treatment of a workpiece can be easily performed by heat-treating or burning the workpiece in an oxygen-containing atmosphere. The oxygen-containing atmosphere may be ambient atmosphere. In the case where the workpiece is heat-treated, it may be performed at 350° C. to 1000° C. for 1 hour to 5 hours, for example. In the case where the workpiece is burned, it may be performed by spontaneous ignition or artificial ignition, for example. In addition, the oxidation treatment of a workpiece may also be performed by an alkali treatment, in which the oxidation of a workpiece proceeds in an aqueous alkali solution. Examples of alkalis that can be used for the alkali treatment include sodium hydroxide, potassium hydroxide, sodium hydrogen carbonate, sodium carbonate, and ammonia. In addition, the concentration of the aqueous alkali solution may be 0.1 mol/L to 10 mol/L. The treatment temperature may be 60° C. to 150° C., but is preferably 100° C. or more to increase the effectiveness of the oxidation treatment, and preferably 130° C. or less to further enhance safety. The treatment time may be 30 minutes to 10 hours. The oxidation treatment of a workpiece may be performed by a single method or may also be performed by a combination of a plurality of methods. As a result of the oxidation treatment of a workpiece in this manner, the molar concentration of oxygen contained in the workpiece becomes 1.5 times or more the molar concentration of a rare earth element, whereby the rare earth element can be converted into an oxide more reliably. It is preferable that as a result of the oxidation treatment, the molar concentration of oxygen contained in the workpiece becomes 2.0 times or more the molar concentration of a rare earth element. In addition, it is preferable that the oxidation treatment of a workpiece is performed in the absence of carbon. This is because when the oxidation treatment of a workpiece is performed in the presence of carbon, a rare earth element contained in the workpiece may undergo an undesirable chemical reaction with carbon, thereby inhibiting the desired conversion into an oxide (thus, "in the absence of carbon" herein means that carbon that causes a chemical reaction enough to inhibit the conversion of a rare earth element contained in the workpiece into an oxide is not present).

Next, the oxidation-treated workpiece is moved to an environment that carbon black is present, and subjected to a heat treatment at a temperature of 1000° C. or more in an inert gas atmosphere or in vacuum, whereby a rare earth element can be separated in the form of an oxide from an iron group element. This is based on the following phenomenon found by the present inventors. When the oxidation-treated workpiece is subjected to a heat treatment at a temperature of 1000° C. or more while supplying carbon black, an oxide of a rare earth element contained in the oxidation-treated workpiece remains an oxide as it is. Meanwhile, an iron group element dissolves carbon derived from carbon black to form an alloy, and an oxide of an iron group element is reduced by carbon derived from carbon black and then dissolves carbon to form an alloy. As a result, an oxide of a rare earth element and an alloy of an iron group element and carbon are present independently of each other. The role of carbon is thus completely different from that in the method described in Patent Document 2, in which carbon is used to oxidize only a rare earth element, without oxidizing an iron group element, contained in the workpiece. The reason why the heat treatment temperature is specified to 1000° C. or more is that when the temperature is less than 1000° C., the alloying of an iron group element with carbon or the reduction of an oxide of an iron group element by carbon does not sufficiently proceed. As a result, an oxide of a rare earth element and an alloy of an iron group element and carbon are less likely to be present independently of each other, making it difficult to separate the two. The heat treatment temperature is preferably 1300° C. or more, more preferably 1350° C. or more, and still more preferably 1400° C. or more. In the case where the heat treatment temperature is 1300° C. or more, an oxide of a rare earth element and an alloy of an iron group element and carbon melt without mixing with each other by compatibility, whereby they can be separated as independent melts. Incidentally, in view of energy cost, for example, the upper limit of the heat treatment temperature is preferably 1700° C., more preferably 1650° C., and still more preferably 1600° C. The heat treatment time is suitably 1 minute to 3 hours, for example. In the method of the present invention, carbon black used as a carbon supply source to an oxidation-treated workpiece is fine particles of carbon having an average particle size of 1 nm to 500 nm. It is usually in the form of a powder made of aggregated particles formed by aggregating fine particles and having a size of about 1 μm to about 1 mm, wherein individual fine particles are fused to each other in a linear chain or in an irregular, complicated branched chain. Specific examples of carbon blacks include furnace black produced by the furnace process, channel black produced by the channel process, acetylene black produced by the acetylene process, and thermal black produced by the thermal process. They may be commercially available products. They may be used alone, and it is also possible to use a mixture of two or more kinds. In addition, for the purpose of preventing the formation of dust or improving handleability, etc., the carbon black may also be particles granulated in the form of beads having a size of about 300 μm to about 3 mm. The carbon black amount used depends also on the degree of oxidation of an iron group element contained in the workpiece as a result of the previous oxidation treatment, but is preferably 0.5 times or more, in the molar ratio, an iron group element contained in the workpiece, more preferably 1.0 time or more, and still more preferably 1.5 times or more. By adjusting the carbon black amount used to 1.5 times or more, in the molar ratio, an iron group element contained in the workpiece, even when the iron group element contained in the workpiece is entirely converted into an oxide by the oxidation treatment, the oxide can be reliably reduced, allowing for the progress of alloying with carbon. Incidentally, the upper limit of the carbon black amount used is not particularly limited. For example, even when an excess carbon black amount, such as 10 times or more, in the molar ratio, an iron group element contained in the workpiece, is used, the unconsumed carbon black does not adversely affect the separation between a rare earth element and an iron group element (this is likely to be partly because carbon black is usually in aggregate state wherein individual fine particles are fused to each other as mentioned above, and thus contains a large amount of air and has low density, resulting in mild reactivity). The unconsumed carbon black can be recovered and reused. This is one of the advantages of the present invention. The heat treatment of the oxidation-treated workpiece in the presence of carbon black may be performed with the oxidation-treated workpiece and carbon black being placed in a treatment container. The method for placing the oxidation-treated workpiece and carbon black in a treatment container is not particularly limited. An example thereof is a method in which a previously prepared mixture of the oxidation-treated workpiece and carbon black (it may be a simple mixture, or may also be pressed in a briquette form) is placed in a treatment container. It is also possible that carbon black is first placed in a treatment container so as to cover at least the bottom surface of the container, and then the oxidation-treated workpiece or a mixture of the oxidation-treated workpiece and carbon black is placed therein. By employing such a method, even when the treatment container is made of a material that reacts with the oxidation-treated workpiece upon a heat treatment, because the treatment container can be prevented from direct contact with the oxidation-treated workpiece, such a reaction can be avoided. Therefore, the material of the treatment container that can be used in the method of the present invention is not particularly limited. In addition to a carbon crucible used in the method described in Patent Document 2, it is also possible to use a non-carbon treatment container, such as a ceramic crucible made of a metal oxide including alumina, magnesium oxide, calcium oxide, etc., or silicon oxide (it may be made of a single material or may also be made of a plurality of materials). Incidentally, in the case where a carbon crucible is used as a treatment container, the carbon crucible can also be expected to serve as a carbon supply source to the oxidation-treated workpiece. In the method of the present invention, the reason why the heat treatment of the oxidation-treated workpiece is performed in an inert gas atmosphere or in vacuum is that when the heat treatment is performed in an oxygen-containing atmosphere such as ambient atmosphere, oxygen in the atmosphere may react with carbon black to produce carbon dioxide, preventing the carbon black from efficiently serving as a carbon supply source to the oxidation-treated workpiece. In addition, in the case where there is remaining carbon black that has not been consumed in the heat treatment, the above configuration allows the excess carbon black in the treatment container after the heat treatment to be recovered and reused. When the heat treatment is performed in an oxygen-containing atmosphere, the excess carbon black in the treatment container reacts with oxygen in the atmosphere to form carbon dioxide and is discharged from the treatment container. Thus, it cannot be recovered any more. An inert gas atmosphere can be formed using argon gas, helium gas, nitrogen gas, etc. The oxygen content thereof is preferably less than 1 ppm. In addition, the vacuum level is preferably less than 1000 Pa.

When the oxidation-treated workpiece is thus subjected to a heat treatment in the presence of carbon black and then cooled, depending on the difference in the method for the oxidation treatment of the workpiece, the difference in the temperature or time of the heat treatment of the oxidation-treated workpiece, the difference in the carbon black amount supplied, etc., the following products are present in the treatment container: two kinds of masses that are present independently of but in close contact with each other, a single-form mass having adhering to the sphere surface thereof an adhering substance that easily comes off upon the application of physical impact, a powder with individual particles having adhering to the sphere surface thereof an adhering substance that easily comes off upon the application of physical impact, or a simple mass made of coarse particles joined together. An oxide of a rare earth element can be recovered as one of the two kinds of masses that are present independently of but in close contact with each other, or as the adhering substance adhering to the sphere surface and forming the single-form mass or the individual particles of the powder. These modes are often seen in the case where the heat treatment temperature is 1300° C. or more. Incidentally, the other of the two kinds of masses that are present independently of but in close contact with each other and the sphere forming the single-form mass or the individual particles of the powder are each an alloy of an iron group element and carbon. In addition, in the case where the heat treatment temperature is less than 1300° C., a simple mass made of coarse particles joined together is often obtained as the product. Individual particles forming this mass each have a two phase structure, and one of them is an oxide of a rare earth element, while the other is an alloy of an iron group element and carbon. Therefore, when the individual particles forming this mass are ground to a size of 5 µm or less, for example (the level of grinding is preferably 3 µm or less, more preferably 1 µm or less; the lower limit is 0.1 µm, for example), and a powder of the phase made of an alloy of an iron group element and carbon is separated by a magnetic method, a powder of the phase made of an oxide of a rare earth element can be recovered. In addition, when this mass is melted by a heat treatment at a temperature of 1300° C. or more in an inert gas atmosphere or in vacuum, an oxide of a rare earth element can be recovered as one of the two kinds of masses that are present independently of but in close contact with each other. The recovered oxide of a rare earth element can be reduced by molten salt electrolysis, for example, and thus converted into a rare earth metal. In the case where there is excess carbon black in the treatment container after the heat treatment, the mass and carbon black present in the treatment container can be easily separated from each other by a magnetic method or using a screen. The separated carbon black can be recovered and reused as mentioned above.

The form of the product obtained by the heat treatment of the oxidation-treated workpiece in the presence of carbon black also varies depending on the difference in the particle size of carbon black. For example, in the case where the heat treatment temperature is 1300° C. or more, when the particle size of carbon black is large (e.g., when the size is more than 500 µm), the product tends to be two kinds of masses that are present independently of but in close contact with each other, and an oxide of a rare earth element can be recovered as one of the two kinds of masses (the other of the two kinds of masses is an alloy of an iron group element and carbon). With a decrease in the particle size of carbon black, the product tends to be a single-form mass having adhering to the sphere surface thereof an adhering substance that easily comes off upon the application of physical impact, and an oxide of a rare earth element can be recovered as the adhering substance adhering to the sphere surface and forming the single-form mass (the sphere is an alloy of an iron group element and carbon). When the particle size of carbon black is small (e.g., when the size is less than 125 µm), the product tends to be a powder with individual particles having adhering to the sphere surface thereof an adhering substance that easily comes off upon the application of physical impact, and an oxide of a rare earth element can be recovered as the adhering substance adhering to the sphere surface and forming the individual particles of the powder (the sphere is an alloy of an iron group element and carbon). Like this, regardless of the particle size of carbon black, an oxide of a rare earth element can be separated from an alloy of an iron group element and carbon. Therefore, the particles of carbon black may be of any size, examples thereof including fine particles of carbon having an average particle size of 1 nm to 500 nm, aggregated particles formed by aggregating fine particles and having a size of about 1 µm to about 1 mm, and particles granulated in the form of beads having a size of about 300 µm to about 3 mm. However, in light of the ease of the operation of separating an oxide of a rare earth element from an alloy of an iron group element and carbon, it is preferable that the product is two kinds of masses that are present independently of but in close contact with each other or a single-form mass. Accordingly, the particle size of carbon black is preferably large rather than small, and specifically a size of 125 μm or more is preferable. It is thus preferable that carbon black contains particles having a size of 125 μm or more. The proportion of particles having a size of 125 μm or more contained in carbon black is preferably 85% or more, more preferably 90% or more, and still more preferably 95% or more. In addition, it is more preferable that carbon black contains particles having a size of 300 μm or more, still more preferably particles having a size of 500 μm or more. The details are not necessarily clear, but are likely to be as follows. In the case where the heat treatment temperature is 1300° C. or more, for example, when carbon black having a large particle size is used, a melt of an oxide of a rare earth element and a melt of an alloy of an iron group element and carbon, which are produced in the heat treatment, are both large in size, and thus the two can be easily separated.

In the case where the workpiece containing at least a rare earth element and an iron group element, to which the method of the present invention is to be applied, contains boron as an additional element, such as in the case of an R—Fe—B based permanent magnet, boron is somewhat contained in an oxide of a rare earth element recovered by separation from an alloy of an iron group element and carbon by the method of the present invention. When such a boron-containing oxide of a rare earth element is reduced by molten salt electrolysis using a fluorine-containing molten salt component, boron contained in the oxide of a rare earth element may react with fluorine to produce harmful boron fluoride. Therefore, in such a case, it is preferable to previously reduce the boron content of the oxide of a rare earth element. The boron content of a boron-containing oxide of a rare earth element can be reduced, for example, by a heat treatment of the boron-containing oxide of a rare earth element together with a carbonate of an alkali metal (lithium carbonate, sodium carbonate, potassium carbonate, etc.) or an oxide of an alkali metal in the presence of carbon, for example. The heat treatment in the presence of carbon may be performed at 1300° C. to 1600° C. using graphite (black lead or plumbago), charcoal, coke, coal, diamond, carbon black, or the like as a carbon supply source, for example. The heat treatment time is suitably 30 minutes to 5 hours, for example. It is advantageous to use a carbon crucible in the heat treatment, because the carbon crucible serves as a treatment container and also as a carbon supply source from the surface thereof (needless to say, this does not discourage the further addition of other carbon supply sources). The amount of a carbonate or an oxide of an alkali metal used may be 0.1 parts by weight to 2 parts by weight per part by weight of a boron-containing oxide of a rare earth element, for example.

EXAMPLES

Hereinafter, the present invention will be described in detail with reference to the examples. However, the present invention should not be construed as being limited to the following descriptions.

Example 1

Magnet processing waste having a particle size of about 10 μm produced during the R—Fe—B based permanent magnet production process (stored in water for seven days to prevent spontaneous ignition) was dehydrated by suction filtration, and then fire was set in ambient atmosphere to burn the waste, thereby performing an oxidation treatment. Table 1 shows the results of ICP analysis (apparatus used: ICPV-1017 manufactured by Shimadzu Corporation, the same hereinafter) and gas analysis (apparatus used: EMGA-550W manufactured by HORIBA Ltd., the same hereinafter) of the magnet processing waste thus oxidation-treated. The molar concentration of oxygen contained in the oxidation-treated magnet processing waste was 7.6 times the molar concentration of rare earth elements.

TABLE 1

| Fe | Nd | Pr | Dy | B | Al | Si | Na | C | O |
|---|---|---|---|---|---|---|---|---|---|
| 49.2 | 16.4 | 4.1 | 2.9 | 0.76 | 0.17 | 0.04 | 0.02 | 0.52 | 19.5 |

(Unit: mass %)

Next, 5.00 g of the oxidation-treated magnet processing waste was mixed with each amount (0.4 g, 0.6 g, 0.8 g, 1.0 g, and 1.4 g) of carbon black (furnace black manufactured by Tokai Carbon Co., Ltd.: powder form, the proportion of particles having a size of 300 μm or more is about 95% and the proportion of particles having a size of 125 μm or more is about 98%, the same hereinafter), placed in a carbon crucible (made of black lead) having a dimension of 35 mm in outer diameter×15 mm in height×5 mm in thickness, and then subjected to a heat treatment in an industrial argon gas atmosphere (oxygen content: 0.2 ppm, flow rate: 5 L/min, the same hereinafter) at 1450° C. for 1 hour. Subsequently, the carbon crucible was furnace-cooled to room temperature. FIG. 1 shows the inside of each carbon crucible furnace-cooled to room temperature after the heat treatment (except for the case where a carbon black amount was 0.4 g, there was excess carbon black in the crucibles after the heat treatment, but the carbon black that was present in the crucibles has been removed in FIG. 1). As is clear from FIG. 1, at any of the carbon black amounts of 0.4 g, 0.6 g, 0.8 g, 1.0 g, and 1.4 g, in the crucible, two kinds of masses A and B were present independently of but in close contact with each other and fixed to the crucible. At carbon black amounts of 1.0 g and 1.4 g, in addition to the two kinds of masses A and B, single-form masses C were also present without fixing to the crucible. The mass C was made of a sphere and an adhering substance on the surface of the sphere that would easily come off when hit with a muller. FIG. 2 shows cross-sections of the mass A and the mass B and also a cross-section of the mass C, which are present in the crucible at a carbon black amount of 1.4 g. In addition, Table 2 shows the results of SEM-EDX analysis (apparatus used: 5800 manufactured by Hitachi High-Technologies Corporation, the same hereinafter) of the mass A and the mass B at carbon black amounts of 0.4 g, 0.6 g, 0.8 g, and 1.0 g, and of the sphere and the adhering substance adhering to the sphere surface, the both of which form the mass C at a carbon black amount of 1.4 g (the molar ratio in Table 2 means the molar ratio of carbon black relative to iron contained in the magnet processing waste). As is clear from Table 2, the main components of the mass A and the sphere forming the mass C were iron, while the main components of the mass B and the adhering substance adhering to the sphere surface and forming the mass C were rare earth elements. This shows that rare earth elements had been separated in the form of oxides from iron (to make sure, X-ray diffraction analysis was separately performed using a standard sample (apparatus used: D8 ADVANCE manufactured by Bruker AXS, the same hereinafter) to confirm that the rare earth elements were oxides. Incidentally, even at a carbon black amount of 0.4 g or 0.6 g, which is less than 1.5 times, in the molar ratio, iron contained in the magnet processing waste, rare earth elements could be separated from iron. This is likely to be because iron contained in the magnet processing waste was not entirely converted into an oxide by the oxidation treatment in this experiment, or because the carbon crucible used as a treatment container functioned as a carbon supply source. In addition, even at a carbon black amount of 1.0 g or 1.4 g, which is more than 1.5 times, in the molar ratio, iron contained in the magnet processing waste, rare earth elements could be separated from iron. This shows that even when an excess carbon black amount is used, the unconsumed carbon black does not adversely affect the separation between rare earth elements and iron.

TABLE 2

| Carbon Black Amount (Molar Ratio) | | Fe | Nd | Pr | Dy | Al | C | O |
|---|---|---|---|---|---|---|---|---|
| 0.4 g (0.76) | Mass A | 92.5 | — | — | — | — | 7.5 | — |
| | Mass B | — | 59.2 | 17.1 | 11.7 | 0.4 | — | 11.6 |
| 0.6 g (1.14) | Mass A | 87.9 | — | — | — | — | 12.1 | — |
| | Mass B | — | 58.0 | 17.1 | 12.1 | 0.6 | — | 12.2 |
| 0.8 g (1.51) | Mass A | 92.8 | — | — | — | — | 7.2 | — |
| | Mass B | — | 59.5 | 16.6 | 12.8 | 0.7 | — | 10.5 |
| 1.0 g (1.89) | Mass A | 93.3 | — | — | — | — | 6.7 | — |
| | Mass B | — | 58.7 | 18.2 | 11.9 | 0.4 | — | 10.9 |
| 1.4 g (2.65) | Mass C: Sphere | 86.1 | — | — | — | — | 13.9 | — |
| | Mass C: Adhering Substance | — | 58.2 | 17.2 | 13.2 | 0.5 | — | 11.0 |

(Unit: mass %, —: below the detection limit)

Example 2

In the same manner as in Example 1, 5.00 g of the oxidation-treated magnet processing waste was mixed with each amount (0.6 g, 0.8 g, and 1.0 g) of carbon black (furnace black manufactured by Tokai Carbon Co., Ltd.), placed in an alumina crucible having a dimension of 45 mm in outer diameter×36 mm in height×2.5 mm in thickness, and then subjected to a heat treatment in an industrial argon gas atmosphere at 1450° C. for 1 hour. Subsequently, the alumina crucible was furnace-cooled to room temperature, and the excess carbon black amount present in the crucible was measured. The results were 0.09 g, 0.24 g, and 0.47 g, respectively. These results show that the carbon black amounts consumed by the heat treatment were 0.51 g, 0.56 g, and 0.53 g, respectively, and that in all the cases, almost the same carbon black amount was consumed for the reduction of iron oxides contained in the oxidation-treated magnet processing waste and also for alloying with iron. Incidentally, in the crucible after the heat treatment, a mass A containing iron as a main component and a mass B containing rare earth elements as main components were present independently of but in close contact with each other and fixed to the crucible. This shows that rare earth elements had been separated in the form of oxides from iron.

Example 3

In the same manner as in Example 2, 5.00 g of the oxidation-treated magnet processing waste was mixed with 0.6 g of carbon black (furnace black manufactured by Tokai Carbon Co., Ltd.), placed in an alumina crucible having a dimension of 45 mm in outer diameter×36 mm in height×2.5 mm in thickness, and then subjected to a heat treatment in an industrial argon gas atmosphere at 1450° C. for 1 hour. As carbon black, the excess carbon black generated in each heat treatment in Example 2 was recovered and used. Subsequently, the alumina crucible was furnace-cooled to room temperature. As a result, in the crucible, a mass A containing iron as a main component and a mass B containing rare earth elements as main components were present independently of but in close contact with each other and fixed to the crucible. These results show that excess carbon black generated in a previous heat treatment can also be reused to separate rare earth elements in the form of oxides from iron.

Example 4

A heat treatment was performed in the same manner as in Example 1, except that an amount of carbon black (furnace black manufactured by Tokai Carbon Co., Ltd.) sufficient to entirely cover the inner and bottom surfaces of a carbon crucible (made of black lead) having a dimension of 70 mm in outer diameter×60 mm in height×10 mm in thickness was placed in the crucible, and then a mixture of 5.00 g of the oxidation-treated magnet processing waste and 1.0 g of carbon black (same) was placed therein. FIG. 3 shows the inside of the carbon crucible furnace-cooled to room temperature after the heat treatment. As is clear from FIG. 3, in the crucible, single-form masses were dispersed in carbon black. The mass was made of a sphere and an adhering substance on the surface of the sphere that would easily come off when hit with a muller. FIG. 4 shows a cross-section of the mass. FIG. 5 shows the appearance of the sphere and that of the adhering substance adhering to the sphere surface, the both of which form the mass. The main component of the sphere forming the mass was iron, while the main components of the adhering substance adhering to the sphere surface were rare earth elements. This shows that rare earth elements had been separated in the form of oxides from iron.

Example 5

A heat treatment was performed in the same manner as in Example 4, except for using an alumina crucible having a dimension of 67 mm in outer diameter×50 mm in height×2.5 mm in thickness. In the alumina crucible furnace-cooled to room temperature after the heat treatment, single-form masses having adhering to the sphere surface thereof an adhering substance that would easily come off when hit with a muller were dispersed in carbon black. The main component of the sphere forming the mass was iron, while the main components of the adhering substance adhering to the sphere surface were rare earth elements. This shows that rare earth elements had been separated in the form of oxides from iron.

Example 6

In the same manner as in Example 1, 5.00 g of the oxidation-treated magnet processing waste was mixed with each amount (0.8 g and 1.8 g) of carbon black (furnace black manufactured by Tokai Carbon Co., Ltd.), placed in a carbon crucible (made of black lead) having a dimension of 35 mm in outer diameter×15 mm in height×5 mm in thickness, and then subjected to a heat treatment in an industrial argon gas atmosphere at 1400° C. for 1 hour. Subsequently, the carbon crucible was furnace-cooled to room temperature. FIG. 6 shows the inside of each carbon crucible furnace-cooled to room temperature after the heat treatment (there was excess carbon black in the crucibles after the heat treatment, but the carbon black that was present in the crucibles has been removed in FIG. 6). As is clear from FIG. 6, at a carbon black amount of 0.8 g, in the crucible, two kinds of masses A and B were present independently of but in close contact with each other and fixed to the crucible, and also single-form masses C were present without fixing to the crucible. At a carbon black amount of 1.8 g, only single-form masses C were present without fixing to the crucible. The mass C was made of a sphere and an adhering substance on the surface of the sphere that would easily come off when hit with a muller. The main components of the mass A and the sphere forming the mass C were iron, while the main components of the mass B and the adhering substance adhering to the sphere surface and forming the mass C were rare earth elements. This shows that rare earth elements had been separated in the form of oxides from iron.

Example 7

In the same manner as in Example 1, 5.00 g of the oxidation-treated magnet processing waste was mixed with 1.0 g of carbon black (furnace black manufactured by Tokai Carbon Co., Ltd.), placed in a carbon crucible (made of black lead) having a dimension of 35 mm in outer diameter× 15 mm in height×5 mm in thickness, and then subjected to a heat treatment in an industrial argon gas atmosphere at 1600° C. for 1 hour. Subsequently, the carbon crucible was furnace-cooled to room temperature. FIG. 7 shows the inside of the carbon crucible furnace-cooled to room temperature after the heat treatment (there was excess carbon black in the crucible after the heat treatment, but the carbon black that was present in the crucible has been removed in FIG. 7). As is clear from FIG. 7, in the crucible, two kinds of masses A and B were present independently of but in close contact with each other and fixed to the crucible, and also single-form masses C were present without fixing to the crucible. The mass C was made of a sphere and an adhering substance on the surface of the sphere that would easily come off when hit with a muller. The main components of the mass A and the sphere forming the mass C were iron, while the main components of the mass B and the adhering substance adhering to the sphere surface and forming the mass C were rare earth elements. This shows that rare earth elements had been separated in the form of oxides from iron.

Example 8

A heat treatment was performed in the same manner as in Example 4, except for using acetylene black (manufactured by Tokai Carbon Co., Ltd.: powder form, the proportion of particles having a size of 300 μm or more is about 95% and the proportion of particles having a size of 125 μm or more is about 98%) as carbon black. In the carbon crucible furnace-cooled to room temperature after the heat treatment, single-form masses having adhering to the sphere surface thereof an adhering substance that would easily come off when hit with a muller were dispersed in carbon black. The main component of the sphere forming the mass was iron, while the main components of the adhering substance adhering to the sphere surface were rare earth elements. This shows that rare earth elements had been separated in the form of oxides from iron.

Example 9

Carbon black (furnace black manufactured by Tokai Carbon Co., Ltd.) was sieved to classify the particles into the following five sizes: >710 μm, 500 μm to 710 μm, 300 μm to 500 μm, 125 μm to 300 μm, and <125 μm. 8.0 g of each of the five fractions was mixed with 40.0 g of the oxidation-treated magnet processing waste and subjected to a heat treatment in the same manner as in Example 4 to examine the influence of the difference in the particle size of carbon black used on the step of the separation of rare earth elements in the form of oxides from iron. FIG. 8 shows each product recovered from the inside of the carbon crucible furnace-cooled to room temperature after the heat treatment. As is clear from FIG. 8, it turned out that the form of the product varies depending on the difference in the particle size of carbon black used. When the particle size of carbon black was large (specifically, when the size was more than 500 μm), the main constituent of the product was two kinds of masses A and B that were present independently of but in close contact with each other. The main component of the mass A was iron, while the main components of the mass B were rare earth elements. With a decrease in the particle size of carbon black, the main constituent of the product became a single-form mass C. The mass C was made of a sphere and an adhering substance on the surface of the sphere that would easily come off when hit with a muller. The main component of the sphere was iron, while the main components of the adhering substance adhering to the sphere surface were rare earth elements. When the particle size of carbon black was small (specifically, when the size was less than 125 μm), the main constituent of the product was a powder D with individual particles having adhering to the sphere surface thereof an adhering substance that easily comes off upon the application of physical impact. The individual particles of the powder D were made of a sphere and an adhering substance on the surface of the sphere that would easily come off when hit with a muller. The main component of the sphere was iron, while the main components of the adhering substance adhering to the sphere surface were rare earth elements. This shows that regardless of the particle size of carbon black used, rare earth elements had been separated in the form of oxides from iron. However, in light of the ease of the operation of separating oxides of rare earth elements from iron, it is preferable that the main constituent of the product is two kinds of masses A and B that are present independently of but in close contact with each other or a single-form mass C. Therefore, it turned out that it is preferable to use carbon black having a particle size of 125 μm or more.

Example 10

Magnet processing waste having a particle size of about 10 μm produced during the R—Fe—B based permanent magnet production process (stored in water for seven days to prevent spontaneous ignition) was dehydrated by suction filtration, and then fire was set in ambient atmosphere to burn the waste, thereby performing an oxidation treatment. Table 3 shows the results of ICP analysis and gas analysis of the magnet processing waste thus oxidation-treated. The molar concentration of oxygen contained in the oxidation-treated magnet processing waste was 7.7 times the molar concentration of rare earth elements.

TABLE 3

| Fe | Nd | Pr | Dy | B | Co | C | O |
|------|------|------|------|------|------|------|------|
| 50.3 | 15.2 | 4.36 | 3.84 | 0.78 | 1.34 | 0.52 | 19.8 |

(Unit: mass %)

Next, 50.0 g of the oxidation-treated magnet processing waste was mixed with 10.0 g of carbon black (furnace black manufactured by Tokai Carbon Co., Ltd.), placed in a carbon crucible (made of black lead) having a dimension of 70 mm in outer diameter×60 mm in height×10 mm in thickness, and then subjected to a heat treatment in an industrial argon gas atmosphere at each temperature (900° C., 950° C., 1000° C., and 1050° C.) for 1 hour. Subsequently, the carbon crucible was furnace-cooled to room temperature. FIG. 9 shows the inside of each carbon crucible furnace-cooled to room temperature after the heat treatment. At any of the heat treatment temperatures of 900° C., 950° C., 1000° C., and 1050° C., in the crucible, a simple mass made of coarse particles joined together (a brittle product that would break with slight force) was present on the entire bottom surface of the crucible without fixing. FIG. 10 shows the results of X-ray diffraction analysis of the individual particles forming the simple mass recovered from the inside of the crucible in each case, the oxidation-treated magnet processing waste before the heat treatment, and the oxides of rare earth elements obtained in Example 1 (a mass B at a carbon black amount of 1.0 g). As is clear from FIG. 10, with respect to the individual particles forming the simple masses produced at the heat treatment temperatures of 1000° C. or more, the peaks of iron oxides ($Fe_2O_3$, $NdFeO_3$) disappeared, showing that they were reduced by carbon derived from carbon black. FIG. 11 (a cross-sectional SEM image) and Table 4 show the results of SEM-EDX analysis of a cross-section of the individual particle forming the simple mass produced at the heat treatment temperature of 1000° C. As is clear from FIG. 11 and Table 4, it turned out that the individual particles forming the mass each have a two phase structure consisting of a phase A and a phase B, and that the phase A contains iron as a main component, while the phase B contains rare earth elements as main components. The individual particles forming the mass were ground to a size of about 1 μm using a commercially available grinding machine, and then a powder of the phase A containing iron as a main component was separated by a magnetic method, whereby a powder of the phase B containing rare earth elements as main components was recovered.

TABLE 4

|  | Fe | Nd | Pr | Dy | Co | C | O |
|---------|------|------|------|------|------|------|------|
| Phase A | 85.2 | — | — | — | 4.5 | 10.4 | — |
| Phase B | — | 49.0 | 12.9 | 14.0 | — | — | 24.1 |

(Unit: mass %, —: below the detection limit)

Comparative Example 1

A heat treatment was performed in the same manner as in Example 1, except that 5.00 g of a prismatic magnet of 10 mm in length×1 mm in width×1 mm in thickness having the same composition as the magnet processing waste described in Example 1 was placed in a carbon crucible without performing an oxidation treatment. FIG. 12 shows the inside of the carbon crucible furnace-cooled to room temperature after the heat treatment. As is clear from FIG. 12, two kinds of masses were not formed in the crucible, and rare earth elements could not be separated in the form of oxides from iron. Incidentally, when allowed to stand in ambient atmosphere, the heat-treated magnet collapsed with an offensive odor. These results show that in the case where the method described in Patent Document 2 is implemented using an industrial argon gas having an oxygen content of 0.2 ppm, rare earth elements and iron cannot be separated.

Comparative Example 2

A magnetic ingot having the composition shown in Table 5 (based on ICP analysis) was ground to a particle size of about 500 μm. 2.00 g of the obtained ground product was subjected to a heat treatment in the same manner as in Example 1, except that it was placed in a carbon crucible without performing an oxidation treatment. The carbon crucible after the heat treatment was furnace-cooled to room temperature. As a result, two kinds of masses were not formed in the crucible, and rare earth elements could not be separated in the form of oxides from iron. Incidentally, when allowed to stand in ambient atmosphere, the heat-treated ground product collapsed with an offensive odor. These results show that in the case where the method described in Patent Document 2 is implemented using an industrial argon gas having an oxygen content of 0.2 ppm, rare earth elements and iron cannot be separated.

TABLE 5

| Fe | Nd | Pr | Dy | B | Al | Co | Cu | Si | Others |
|------|------|-----|-----|-----|-----|-----|-----|------|--------|
| 65.3 | 22.8 | 0.1 | 8.6 | 0.9 | 0.2 | 0.9 | 0.1 | 0.02 | 1.08 |

(Unit: mass %)

Comparative Example 3

The magnet processing waste described in Example 1 was dried on a hot plate at 80° C. over 1 hour. 5.00 g of the dried product was subjected to a heat treatment in the same manner as in Example 1, except that it was placed in a carbon crucible without performing an oxidation treatment. The carbon crucible after the heat treatment was furnace-cooled to room temperature. As a result, two kinds of masses were not formed in the crucible, and rare earth elements could not be separated in the form of oxides from iron. Incidentally, when allowed to stand in ambient atmosphere, the heat-treated magnet processing waste collapsed with an offensive odor. These results show that in the case where the method described in Patent Document 2 is implemented using an industrial argon gas having an oxygen content of 0.2 ppm, rare earth elements and iron cannot be separated.

INDUSTRIAL APPLICABILITY

According to the present invention, a method for recovering a rare earth element from a workpiece containing at least a rare earth element and an iron group element, which can be put into practical use as a low-cost, simple recycling system, can be provided. In this respect, the present invention is industrially applicable.

The invention claimed is:

1. A method for recovering a rare earth element from a workpiece containing at least a rare earth element and an iron group element, comprising:
   separating a rare earth element in the form of an oxide from an iron group element by
   (1) subjecting a workpiece to a treatment environment that provides an oxidation treatment,
   (2) then turning the treatment environment into an environment where carbon black is present, and
   (3) then subjecting the oxidation-treated workpiece to a heat treatment in the presence of the carbon black at a temperature of 1000° C. or more in an inert gas atmosphere or in vacuum, wherein the molar ratio of the carbon black to the iron group element contained in the workpiece is 10 or more, and unconsumed carbon black is recovered and reused for recovering a rare earth element.

2. The method according to claim 1, characterized in that the carbon black contains particles having a size of 125 μm or more.

3. The method according to claim 1, characterized in that at least part of the workpiece is in granular or powder form having a particle size of 500 μm or less.

4. The method according to claim 1, characterized in that the workpiece has an iron group element content of 30 mass % or more.

5. The method according to claim 1, characterized in that the workpiece is an R—Fe—B based permanent magnet, where R is a rare earth element.

* * * * *